3,126,346
FERROMAGNETIC COMPOSITIONS AND THEIR
PREPARATION
Tom A. Bither, Jr., Wilmington, Del., assignor to E. I.
du Pont de Nemours and Company, Wilmington, Del.,
a corporation of Delaware
Filed Oct. 31, 1960, Ser. No. 66,195
8 Claims. (Cl. 252—62.5)

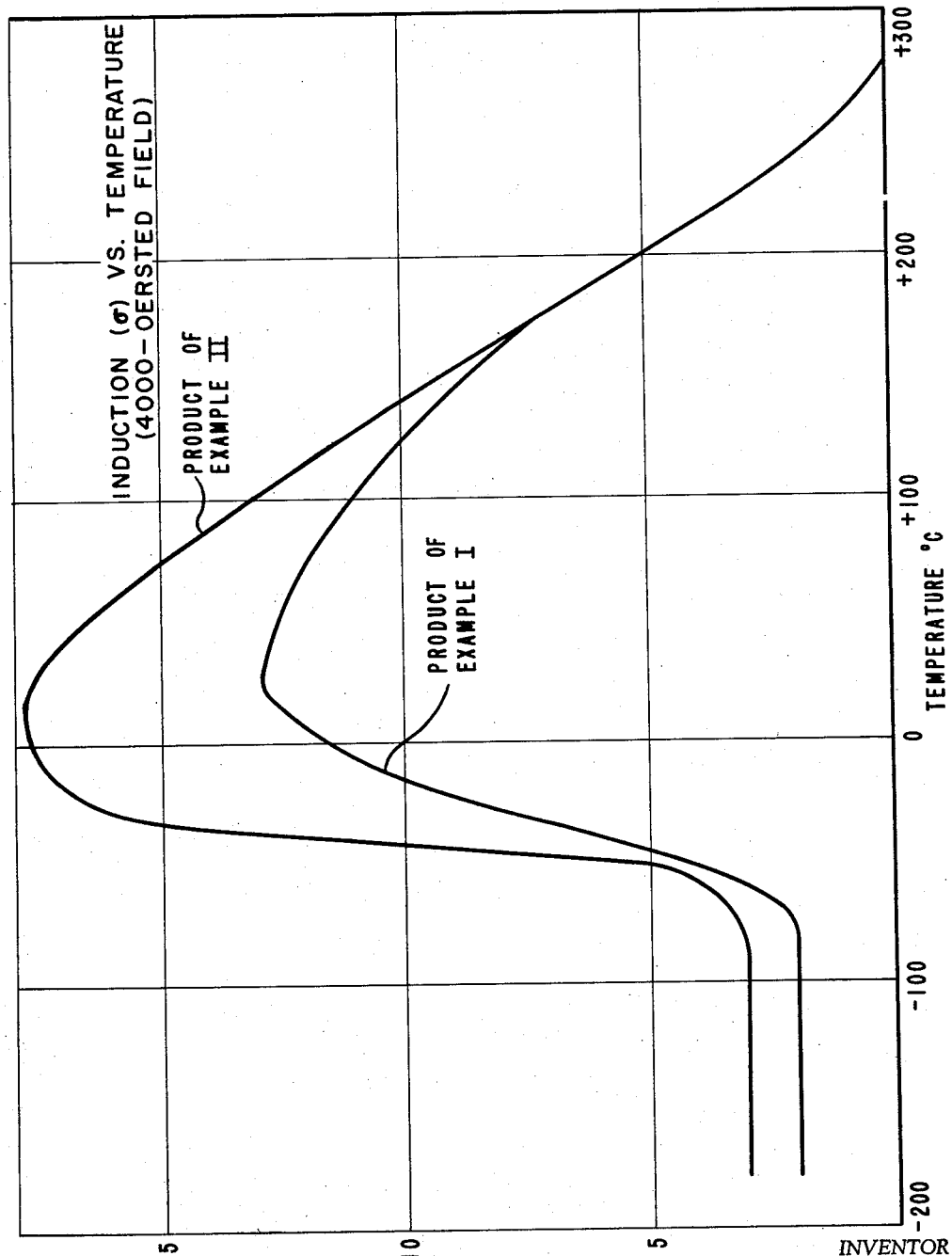

This invention relates to ferromagnetic materials and to methods for their preparation. More particularly, this invention relates to ferromagnetic compositions exhibiting a maximum saturation induction within a restricted temperature range and a very much smaller induction at temperatures both above and below this range, and to methods for the preparation of such compositions.

Conventional magnetic materials are characterized by a saturation induction that decreases monotonically as temperature increases. Above a temperature termed the Curie temperature, for Curie point, the behavior of such materials becomes that of a paramagnetic substance, but at lower temperatures, even as low as the boiling point of liquid helium and below, ferromagnetic behavior is retained and saturation induction increases continuously as temperature decreases.

A few materials have been reported such as sulfides of chromium and iron of specific composition for which saturation induction increases with increasing temperature in a temperature range below the Curie point. The effect has not been well characterized in these materials, however, because of an extremely critical dependence on metal-sulfur ratio and, especially for the iron sulfide, on prior thermal history. Recently there has been developed a class of ferromagnetic compositions which exhibit a maximum saturation induction between 0° K. and the Curie point of the composition. These compositions contain at least two transition elements selected from groups V–B, VI–B, and VII–B of the periodic table, of which at least one is taken from the first row of said transition elements, and at least one element selected from the class consisting of arsenic and antimony. Such compositions are fully described and claimed in the copending application of Thomas J. Swoboda, Serial No. 19,370, filed April 1, 1960, now abandoned, and its continuation-in-part, Ser. No. 181,744, filed March 22, 1962. These compositions possess characteristics rendering them useful in a variety of applications.

It is an object of this invention to provide new ferromagnetic compositions based on readily available components which exhibit a maximum saturation induction within a useful temperature range. Another object is to provide a method for preparing such compositions.

These and other objects are obtained by providing ferromagnetic compositions comprising (a) as the sole transition metal component a single metal of groups VI–B, VII–B, and VIII of the periodic table, said metal being present in an amount of 61–75 atom percent, and (b) from 25–39 atom percent of at least two elements selected from the class consisting of gallium, germanium, selenium, tellurium and elements of group V–A of atomic number greater than 15, the major atom percent of said elements being an element of group V–A.

The sole transition metal component of this novel composition is selected from the first row transition metals of groups VI–B, VII–B, and VIII, i.e., this component is chromium, manganese, iron, cobalt, or nickel. Chromium and manganese are preferred as the transition metal component. Of these, manganese produces especially useful compositions.

The periodic table referred to herein is the table appearing in Deming's "General Chemistry," John Wiley & Sons, Inc., 5th ed., Chapter 11.

At least two elements selected from gallium, germanium, selenium, tellurium, and elements of group V–A of atomic number greater than 15 are present in these compositions in total amount of 25–39 atom percent. Of this group, elements of group V–A, i.e., arsenic, antimony, and bismuth, constitute at least the major atom percent of the total. In other words, the content of arsenic, antimony and/or bismuth in the novel compositions of this invention is greater than 12.5 atom percent and may be as much as 39 atom percent. The content of other elements enumerated ranges up to 19 atom percent, provided the conditions described above are fulfilled.

Although any element or combination of elements of group V–A may be employed in these compositions, very desirable magnetic properties result when antimony or arsenic is present as at least part of the group V–A content. Particularly desirable compositions are those containing antimony and arsenic or antimony and germanium.

The compositions of this invention can be described by the formula $M_aQ_bX_c$, where M is chromium, manganese, iron, cobalt or nickel; Q is one or more elements of group V–A; X is one or more of gallium, germanium, selenium, tellurium, and elements of groups V–A; $a$ is 6.1–7.5; $b$ is 1.26–3.9; $c$ is 0–2.0; and $b+c$ is 2.5–3.9, it being understood that Q and X represent elements of atomic number greater than 15 and together represent at least two elements.

Many of the novel compositions of this invention which are useful at temperatures near room temperature, exhibit a tetragonal crystal structure, have a maximum saturation induction at a temperature in the range of −150° to +200° C. and a Curie temperature above 225° C.

The manner in which saturation induction varies with temperature can be controlled by modifying the composition of the ferromagnetic product. Preferred compositions exhibit a saturation induction below the lower ferromagnetic transition temperature which is much smaller than the maximum saturation induction above this temperature.

The novel dependence of magnetization on temperature exhibited by compositions of this invention is believed to result from a transition from an antiferromagnetic to a ferromagnetic state with rise in temperature. At the transition temperature, the total quantum mechanical exchange between neighboring atoms changes sign and it is this exchange inversion which is presumed to be at the basis of the observed change in magnetic properties.

For a better understanding of the unusual magnetic temperature behavior of my compositions, reference should be made to the accompanying drawings showing the relationship between saturation induction and temperature for a representative ferromagnetic composition of the invention. A more detailed description of this induction-temperature curve may be found later in the specification under Examples I and II.

These novel ferromagnetic compositions are prepared by heating mixtures of the elements to a temperature in the range of 600° to 1400° C. In practice, temperatures of 700° to 1200° C. are usually employed. Temperatures of at least 850° C. are generally necessary if the composition is to be melted.

The time of heating is not critical but should be sufficient to permit complete reaction of the ingredients. In the examples below, heating times ranging up to about 50 hours are employed. However, longer times may be useful in some cases such as in the preparation of the compositions in single crystal form.

Heating may be carried out at atmospheric pressure with the reactants protected by a blanket of inert gas such as helium or argon. Alternatively, the reaction may be conducted in a sealed, evacuated vessel. It is also possible to employ superatmospheric pressures. Small batches of product may be readily prepared by placing the ingredients in a quartz tube which is then evacuated and sealed. In this case, the reaction is carried out under autogenous pressure developed by the reaction mixture at the reaction temperature.

The materials employed in preparing ferromagnetic compositions of this invention can be the elements themselves or any of the binary or ternary combinations thereof, such as manganese antimonide, chromium arsenide, manganese germanide, gallium-manganese alloy, etc. It is preferred that the materials be in powder or granular form and that they be well mixed before heating is commenced.

After the desired heating cycle has been completed, the reaction mixture is cooled and, if desired, subjected to purification, e.g., by extraction with acids or, after grinding, by magnetic separation. The cooling may be rapid or the product may be annealed by slow cooling.

The novel ferromagnetic compositions of this invention exhibit several magnetic characteristics which make them especially valuable for use in various specific applications. The novel lower ferromagnetic transition temperature is a distinguishing feature conferring unusual utility on these materials. This temperature is determined in the same manner used for the determination of ordinary Curie temperatures, i.e., by the measurement of magnetic response as a function of temperature. It will, of course, be necessary in some instances to modify the usual equipment to the extent of providing means for cooling the sample in addition to the usual heating means. A rapid method for determining qualitatively whether a product, which is magnetic at room temperature, possesses a low temperature magnetic transition point is to observe its magnetic behavior upon cooling to a low temperature such as that of liquid nitrogen.

Another critical magnetic property which is important to the technical utility of these materials is the induction per gram or sigma value, $\sigma_s$, exhibited within the temperature range for which the composition is magnetic. The sigma value, $\sigma_s$, is defined on pp. 7 and 8 of Bozorth's "Ferromagnetism," Van Nostrand Co., New York, 1951. This sigma value is equal to the intensity of magnetization, $I_s$, divided by the density, $d$, of the material. The sigma values given herein are determined in a field of 4000 oersteds on apparatus similar to that described by T. R. Bardell on pp. 226–228 of "Magnetic Materials in the Electric Industry," Philosophical Library, New York, 1955.

The compositions of this invention are illustrated further by the examples below in which the proportions of ingredients are expressed in parts by weight unless otherwise noted. Materials of usual commercial purity are satisfactory for preparing these compositions.

EXAMPLE I

A pelleted blend consisting of 3.66 g. of manganese, 0.34 g. of arsenic and 3.50 g. of antimony was placed in a quartz tube. The pellet contained the elements in the atomic percentages: Mn, 66.7; As, 4.6; Sb, 28.7. The pellet in the tube was heated to a temperature of 253° C. during 5 hours under vacuum and the tube was then sealed off under vacuum. The sealed tube and contents were heated to 600° C. over a 3.5-hour period and a temperature of 600° C. maintained for 1 hour. The mixture was then slowly cooled during approximately 10 hours to room temperature. The pellet at this stage was a bright sintered slug. The tube and contents were placed in a furnace at room temperature and slowly heated to a temperature of 1030° C. during approximately 12 hours. The sample was maintained for an additional 12 hours at this temperature and was then slowly cooled to approximately room temperature over a period of 24 hours by lowering it through the furnace which had a preset fixed thermal gradient.

The product was a silvery, polycrystalline, metallic material which was magnetic at room temperature. Its X-ray diffraction pattern (tabulated below) indicated that the product consisted entirely of a tetragonal crystal structure of the $Cu_2Sb$-type, having cell constants of $a$, 4.04 A.; and $c$, 6.45 A.

Table I

X-RAY PATTERN OF MANGANESE-ANTIMONIDE-ARSENIDE

| Interplanar Spacings [1] | Relative Intensities [2] |
|---|---|
| 3.424 | $M_2$ |
| 3.229 | $M_2$ |
| 2.855 | $M_1$ |
| 2.613 | $M_2$ |
| 2.135 | S |
| 2.021 | $M_1$ |
| 1.897 | $M_3$ |
| 1.745 | $M_3$ |
| 1.717 | $M_3$ |
| 1.612 | $M_4$ |
| 1.474 | $M_3$ |
| 1.430 | $M_3$ |
| 1.388 | $M_4$ |
| 1.322 | F |
| 1.309 | F |
| 1.281 | $M_4$ |
| 1.258 | $M_3$ |
| 1.190 | $M_1$ |
| 1.178 | F |

[1] In Angstrom units.
[2] S indicates the strongest line in the pattern, $M_1$, $M_2$, $M_3$ and $M_4$ indicate lines of moderate intensity (decreasing in the order $M_1$ to $M_4$), and F indicates faint lines.

A portion of the product was pulverized and the saturation induction of the powder determined as a function of temperature. The product exhibited a lower magnetic transition at −60° C. and a maximum induction, $\sigma_s$, of 13 gauss cm.³/g. at 20° C. The Curie point was 270° C. The saturation induction as a function of temperature for this product is shown in the accompanying drawing.

EXAMPLE II

A pelleted blend of 1.10 g. of manganese, 1.09 g. of antimony and 0.07 g. of germanium (atom percentages: Mn, 66.7; Ge, 3.3; Sb, 30.0) was placed in an evacuated quartz tube as described in Example I. The tube and contents were slowly heated to 970° C. over a 9-hour period. This temperature was maintained for an additional 9 hours and the tube and contents then cooled to room temperature during a further 9-hour period. The product was a silvery, metallic slug which was strongly magnetic at room temperature. The saturation induction versus temperature relationship was determined on a pulverized sample and is shown in the accompanying drawing. The lower magnetic transition occurred at −60° C., a maximum induction, $\sigma_s$, of 18 gauss cm.³/g. at 10° C. and the Curie point at 270° C. The X-ray diffraction pattern determined from the powdered sample is given below.

Table II
X-RAY PATTERN OF MANGANESE - ANTIMONIDE - GERMANIDE

| Interplanar Spacings [1] | Relative Intensities [2] |
|---|---|
| 6.553 | F |
| 3.450 | $M_1$ |
| 3.264 | $M_2$ |
| 3.045 | $M_3$ |
| 2.873 | $M_1$ |
| 2.627 | $M_1$ |
| 2.396 | F |
| 2.236 | F |
| 2.159 | S |
| 2.088 | F |
| 2.030 | S |
| 1.924 | $M_3$ |
| 1.809 | V |
| 1.748 | $M_3$ |
| 1.726 | $M_3$ |
| 1.679 | V |
| 1.635 | $M_3$ |
| 1.518 | V |
| 1.487 | $M_2$ |
| 1.435 | $M_2$ |
| 1.396 | $M_3$ |
| 1.325 | $M_4$ |
| 1.314 | $M_4$ |
| 1.283 | F |
| 1.275 | $M_3$ |
| 1.260 | F |
| 1.245 | V |
| 1.193 | S |
| 1.110 | F |
| 1.078 | F |

[1] In Angstrom units.
[2] S indicates the strongest line in the pattern, $M_1$, $M_2$, $M_3$ and $M_4$ indicate lines of moderate intensity (decreasing in the order $M_1$ to $M_4$), F indicates faint lines, and V indicates very faint lines.

EXAMPLES III AND IV

Other compositions of manganese, antimony and germanium prepared as described in Example II are summarized in Table III which also lists the Curie temperature ($T_c$), temperature of maximum induction ($T_{max.}$), and lower transition temperature ($T_1$) for these compositions.

Table III

| Example No. | Mn—Sb—Ge (atom percent) | Curie Temperature (° C.) | Temperature of Maximum Induction (° C.) | Lower Transition Temperature (° C.) |
|---|---|---|---|---|
| III | 66.7—31.7—1.6 | 300 | −30 | −85 |
| IV | 66.7—26.7—6.6 | 265 | 75 | 15 |

Other specific compositions, according to the present invention are chromium arsenide-antimonide, iron arsenide-antimonide, nickel arsenide-antimonide, cobalt arsenide-antimonide, managanese telluride-antimonide, manganese gallium-arsenide, chromium gallium-arsenide, iron gallium-arsenide, iron arsenide-telluride, manganese arsenide-bismuthide, manganese germanide-arsenide, manganese antimonide-selenide, manganese arsenide-telluride, chromium arsenide-telluride, manganese arsenide-antimonide-selenide and manganese germanide-bismuthide.

The novel products of this invention are useful at temperatures within the ferromagnetic range, in any of the conventional applications for ferromagnetic materials for which their properties render them suitable, e.g., electromagnets, high frequency coil cores, information and memory storage elements, and the like.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A ferromagnetic composition having a tetragonal crystal structure and comprising as the sole transition metal component from 61 to 75 atom percent of a single metal selected from the class consisting of chromium, manganese, iron, cobalt, and nickel, and from 25 to 39 atom percent of at least two elements selected from the class consisting of gallium, germanium, selenium, tellurium, arsenic, antimony and bismuth, of which at least 12½ atom percent is an element selected from the class consisting of arsenic, antimony, and bismuth.

2. A process for preparing ferromagnetic compositions which comprises heating to a temperature of 600 to 1400° C. a metal selected from the class consisting of chromium, manganese, iron, cobalt, and nickel, and at least two elements of the class consisting of gallium, germanium, selenium, tellurium, arsenic, antimony and bismuth, of which at least a major portion of said elements is an element selected from the group consisting of arsenic, antimony and bismuth.

3. A composition of claim 1 wherein the sole transition metal component is manganese.

4. A composition of claim 3 having a maximum saturation induction at a temperature in the range of −150° C. to 200° C. and a Curie temperature above 225° C.

5. A composition of claim 1 wherein the sole transition metal component is manganese and the two elements of from 25 to 39 atom percent are antimony and arsenic.

6. A composition of claim 5 having a maximum saturation induction at a temperature in the range of −150° C. to 200° C. and a Curie temperature above 225° C.

7. A composition of claim 1 wherein the sole transition metal component is manganese and the two elements of from 25 to 39 atom percent are antimony and germanium.

8. A composition of claim 7 having a maximum saturation induction at a temperature in the range of −150° C. to 200° C. and a Curie temperature above 225° C.

References Cited in the file of this patent
FOREIGN PATENTS
159,988     Switzerland _____ Apr. 17, 1933

OTHER REFERENCES
Foex: Bull. Soc. Chim., France, 1949, Mises au point D 157 D160 QD 1 S4.